(12) United States Patent
Masuda

(10) Patent No.: US 6,750,970 B2
(45) Date of Patent: Jun. 15, 2004

(54) METHOD FOR QUICKLY RETRIEVING APPROXIMATE COLOR OF METALLIC PAINT COLOR

(75) Inventor: Yutaka Masuda, Fujisawa (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 84 days.

(21) Appl. No.: 10/084,476

(22) Filed: Feb. 28, 2002

(65) Prior Publication Data
US 2002/0163640 A1 Nov. 7, 2002

(30) Foreign Application Priority Data

Feb. 28, 2001 (JP) .......................................... 2001-054409

(51) Int. Cl.$^7$ ................................................ G01J 3/46
(52) U.S. Cl. ....................................... 356/402; 356/425
(58) Field of Search ................................ 356/402, 405, 356/421, 425

(56) References Cited

U.S. PATENT DOCUMENTS 4,813,000 A    3/1989  Wyman et al. ............. 356/402
5,473,738 A  * 12/1995  Hamlin et al. ............. 345/594

FOREIGN PATENT DOCUMENTS

JP    10-10045     1/1998
JP    11-211569    8/1999

* cited by examiner

Primary Examiner—Frank G. Font
Assistant Examiner—Roy M. Punnoose
(74) Attorney, Agent, or Firm—Wenderoth, Lind & Ponack, LLP

(57) ABSTRACT

The following procedures are included: a procedure (1) for measuring a metallic paint color by a multi-angle spectrophotometer and storing the multi-angle colorimetric value Lab* of the paint color, a color classification code to which the paint color belongs, and a computer graphic image in a memory of a computer and a procedure (2) for calling a metallic paint color to be retrieved (this is referred to as the metallic paint color concerned) from the memory by using a paint color name as a keyword. Moreover, in the case of a new color not stored in the memory, the color is measured by a multi-angle spectrophotometer and stored in the memory in accordance with the procedure (1). A screening function (3) is included which previously narrows down paint colors whose approximate colors will be computed by using color classification codes when computing an approximate color of the metallic color concerned.

10 Claims, 3 Drawing Sheets

METHOD FOR QUICKLY RETRIEVING APPROXIMATE COLOR OF METALLIC PAINT COLOR

BACKGROUND OF THE INVENTION

1. Field of the Invention

The present invention relates to a color library system for a color designer engaged in metallic-paint-color design capable of easily visually detecting an approximate color by quickly retrieving a metallic paint color to be changed depending on an observing angle by a computer and displaying a retrieved result on a display device (monitor) of the computer as a computer graphic of the metallic paint color.

2. Background and Prior Art of the Invention

A metallic paint color is frequently used which is obtained by adding a colored pigment, a scaly brilliant pigment (such as aluminum flake or pearl flake), and micro titanium dioxide using Rayleigh scattering to a binder in order to improve the design effect in the fields of paint and printing. The maximum feature of the coloring is to make a person feel various textures such as metallic feeling and pearl feeling because brightness, chroma, and hue are changed depending on an observing angle. FIG. 1 shows the paint-film structure and the multi-angle gloss distribution of a general metallic color. By applying light from a direction of 45°, the light is directionally reflected by a brilliant pigment in a paint film. Therefore, there is a feature that the high-light side becomes bright and the shade side becomes dark. Moreover, an angle is generally shown by an open angle from specular reflected light (this is referred to as declination) by assuming the specular reflected light and 0°.

Because development of many new colors is requested from customers (automobile companies, general industrial companies, and construction companies) every year, pain makers prepare a plurality of paint colors matching images of the customers and continuously propose them. However, there is a problem that it is impossible to prepare a sufficient number of paint colors because it takes a lot of time to individually prepare new paint colors every time. Particularly in recent years, because improvement of the products power of automobiles is requested, the importance for the designing characteristic of an exterior color that is most remarkable by consumers is raised. For a designer of an automobile maker using the strategy for improving the products power of automobiles, a step of observing a plurality of colors approximate to image colors of the designer and selecting a better color has been important more and more.

Therefore, paint companies has respectively efficiently prepared a color desired by a customer by detecting a paint color having the color and texture matching the image desired by the customer out of a enormous number of stock colors prepared in the past and tuning the color and texture by using the paint color as a start color and using various color materials.

Moreover, the stock colors also have a role of efficiently handing down the experience, skill, and sense of a veteran color designer to a new color designer, which are properties of a paint company. Therefore, 500 or more new colors are registered every year.

However, when the number of stock colors exceeds 1,000, disadvantages occur that it takes a lot of time to find out a color matching the image of a customer only through visual observation, the work efficiency is deteriorated instead, and stock colors which are also the property of a paint company cannot be effectively used.

Therefore, Japanese Patent Application No. 167960/1987 discloses a method of storing a colorimetric value in a memory of a computer by using a colorimeter and retrieving an approximate color by using a color difference (JIS Z8730) as a parameter. However, though it is possible to achieve an object by computing the color difference between colorimetric values from one angle when using a solid color (color shown by only a pigment which excludes a flake brilliant pigment and whose color is not changed depending on an observing direction), it is impossible to achieve the object for a metallic color which is changed depending on an observing direction by the above method.

The present invention provides a system for quickly computing an approximate color of a metallic paint color which is changed depending on an observing angle and displaying the computed approximate color on a monitor as a computer graphic of the paint color, particularly displaying an approximate color of a metallic paint color preferred by a color designer.

The present invention mainly aims at a computer system to be used by a designer engaged in design of a paint of an exterior color for an automobile. However, when considering that metallic colors containing flake pigments are used for some railroad cars and building armors in recent years, the present invention can be effective means in fields of general industry and construction in future.

SUMMARY OF THE INVENTION

Main components of the present invention are described below. That is, the main components are composed of.

1. a procedure for storing stock colors of metallic colors as the digital information for colorimetric values, color classification codes, and computer graphic images of metallic paint colors by using a colorimeter;
2. an algorithm for quickly retrieving an approximate color of an optional metallic paint color in accordance with a prepared color classification code; and
3. an algorithm for computing an weighted color difference so as to match a visual approximate color in order to compute color differences from a high-light (bright color close to specular reflected light) of a metallic paint color up to a shade (dark color at the opposite side).

A specific treatment method is described below.

A method for measuring a metallic paint color generally uses a multi-angle colorimeter. Various types of colorimeters are marketed. Any colorimeter measures an object under an optical condition according to a general expression of −45°/×1, ×2, ×3, ×4, ×5, . . . , and ×n. In this case, −45° denotes the angle of incident light. However, the angle may be shown as 45° with no negative symbol. Symbol xi denotes a received angle. There are a colorimeter that continuously measures xi and a portable multi-angle colorimeter that discretely measures xi every 10° to 50°. Moreover, there are a colorimeter for measuring XYZ in accordance with the photoelectric tristimulus colorimetry and a colorimeter for measuring a spectral reflectance. Because a continuous-measuring colorimeter can measure an object every optional angle, it can measure from a high-light up to a shade in detail. However, the colorimeter is large and expensive and requires a lot of time for measurement and a lot of measured data. Therefore, it is not suitable for the present system. To obtain the number of measurements necessary and sufficient for the present system, a portable multi-angle spectrophotometer is suitable which can measure from the high-light side up to the shade side at five angles or more. It is recommended to use the method disclosed in Japanese Patent Laid-Open No. 10045/1998 in order to obtain a regression formula for estimating wide-range colors from high-light to shade.

Moreover, to obtain a computer graphic of a metallic paint color from the obtained regression formula, it is possible to use an already-publicly-known method. That is, the above computer graphic can be obtained by converting a reflectance estimated by the regression formula into tristimulus values XYZ in accordance with the expression specified in JIS Z8701 and then, into RGB of a monitor. It is possible to convert XYZ into RGB by using a determinant in accordance with values of XYZ obtained by measuring the spectral brightness of each of R, G, B, and WHITE of the monitor by a spectral-radiant luminance meter. Moreover, to more accurately perform the conversion from XYZ into RGB, it is necessary to obtain the function of luminescent brightness (this is referred to as γ function) to input voltages of R, G, and B of the monitor for correction. To convert XYZ into RGB, it is allowed to directly measure the characteristic of a monitor to be directly. Moreover, it is allowed to simply use a conversion formula announced by CIE (International Commission on Illumination) as an approximation to the NTSC color coordinate to be frequently used for a television by a monitor.

Then, the spectral reflectance of xn angle is converted into XYZ by using the expression in JIS Z8701 and moreover converted into Lab* by using the conversion formula in JIS Z8729.

Then, to quickly retrieve a metallic paint color to be described later, a color classification code is computed in order to prevent computation from requiring a lot of time because much unnecessary computation must be executed including a silver metallic color and a white pearl color completely different from a blue metallic color as objects for approximate-color retrieval when computing all approximate colors of stock colors when retrieving the blue metallic color. Because a metallic color has a characteristic that the color changes depending on an observing angle, color classification codes different in high-light and shade are necessary and thereby, approximate-color retrieval is complicated. Therefore, the present invention uses a typical color Lab* of metallic paint colors disclosed in Japanese Patent Laid-Open No.211569/1999.

To obtain a color classification code of a metallic color from the typical color Lab* of metallic colors, it is possible to use a chromatic method. A chromaticity value meeting the above purpose is converted from Lab* into Lch* in accordance with JIS Z8729 and then, it is possible to use metric chroma c* or metric hue h*. Moreover, it is allowed to convert the chromaticity value from Lab* which is a typical color of metallic paint colors into Hue and Tone values by using the M*MC made by Nippon Color and Design Research Institute Inc. used in Japanese Patent Laid-Open No.211569/1999 and then, use the color classification frequently used for exterior color design of automobiles. FIG. 2 shows an example. Color classification codes are decided by dividing all color areas into 5 to 100 (both included), preferably into 5 to 50 (both included) by any method.

Computer-graphic images of the above computed paint-color name, Lab* of n angle, color-classification code, and metallic paint color are stored in a memory of a computer.

Then, a specific method for retrieving an approximate color is described below. A metallic paint color whose approximate color will be retrieved is prepared. This is referred to as the metallic paint color. When the metallic paint color is included in stock colors, it is possible to call it by a paint color name. When the color is not included in the stock colors, the metallic paint color is temporarily stored in a memory as digital information. The typical color Lab* of the metallic paint color is computed and then, Hue-Tone values are computed to obtain a color classification code to which the color belongs.

It is possible to quickly retrieve an approximate color by extracting only colors having color classification codes same as those of metallic paint colors stored in a computer and computing the color difference between the colors.

A color-difference computation for obtaining an approximate color of a metallic paint color is described below in detail. The metallic paint color has a feature that it is bright in high-light and dark in shade. Though it is possible to compute an approximate color of a solid color shown by only a pigment including no flake pigment in accordance with the color difference formula in JIS Z8730, a case of a metallic paint color is insufficient.

As a result of studying various color difference formulas for retrieving an approximate color of a visually-suitable metallic paint color, the following laws are found.

(1) Though the high-light side has a value for a brightness L* to greatly exceed 98 of white and a value exceeding 200 is frequently obtained from a silver metallic color, the difference between brightnesses cannot be clearly detected through visual observation. For example, even if a color difference at the high-light side of a silver metallic color has a large value of 200 or more, the difference cannot be detected in visual color difference. To make the color difference at the high-light side coincide with visual color-difference feeling, it is preferable to multiply the difference dL* between brightnesses at the high-light side by a weighted factor between 0.3 and 1.0 (both included), more preferably a weighted factor between 0.5 and 0.8 (both included).

(2) Because a brilliant pigment such as aluminum flake or mica flake shines in the case of high-light, the colorimetric value of the high-light is generally large but the colorimetric value of the shade side is small because no flake pigment shines. In the case of visual observation, however, an approximate color is detected because of further laying stress on the color difference between shades. Thereby, when considering three divisions of high-light side, intermediate face, and shade, it is preferable that a color-difference weighted factor ranges between 0.5 and 1.0 (both included), more preferably between 0.7 and 0.9 (both included) for a measuring angle at the high-light side {between 10° and 25° (both included) in terms of open angle from specular reflected light}.

Moreover, it is preferable that the weighted factor ranges between 0.5 and 1.5 (both included), more preferably between 0.8 and 1.2 (both included) at the face side {between 26° and 74° (both included)}.

Furthermore, it is preferable that the weighted factor ranges between 1.0 and 2.0 (both included), more preferably between 1.2 and 1.7 (both included) at the shade side.

DESCRIPTION OF THE EXAMPLE EMBODIMENT (Generation of Database of Metallic Paint Colors)
(1. Measurement of Stock Colors)

Figure 1:
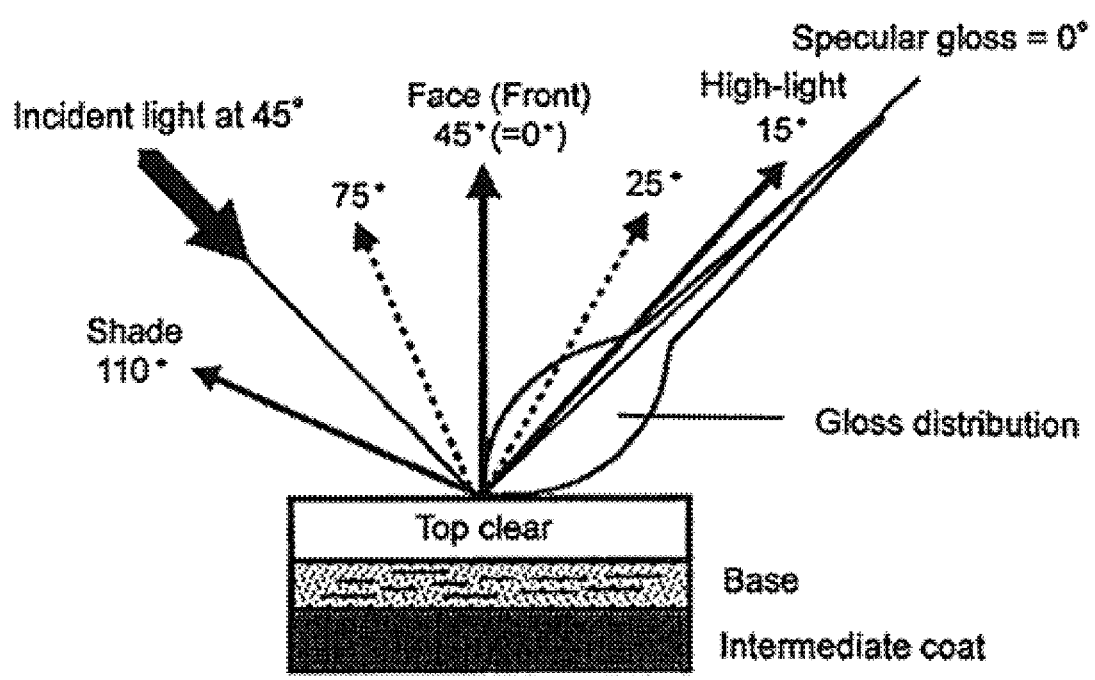
FIG. 1 is an illustration showing a gloss distribution according to a paint film structure and a multi-angle of a metallic paint color.

Stock colors are colors painted on paper, iron plates, and aluminum plates that are stored in paint companies. It is preferable to use a paint plate as horizontal as possible as shown by symbol 1 in FIG. 3. Moreover, it is possible to efficiently sample data by using auto colors in the sample book collecting paint colors of all automobile companies issued by Japan Paint Manufactures Association every March as stock colors. The data is measured by symbol 2 in FIG. 3 serving as a multi-angle spectrophotometer. To generate computer graphics of the paint colors in accordance with colorimetric values, a multi-angle spectrophotometer capable of outputting a spectral reflectance is necessary instead of tristimulus values XYZ or CIE Lab* which can be computed in accordance with the tristimulus values. A multi-angle spectrophotometer generally having three to five measuring angles is marketed and thus, easily available. However, a multi-angle spectrophotometer capable of measuring data at a wide angle width from a high-light (from approx. 10° in terms of a declination from specular reflected light) up to a shade (up to 110° in terms of a declination from specular reflected light) is suited to generate computer graphics. Model MA68 made by X-Rite Inc. in US is preferable as a measuring instrument suitable for the present object. This measuring instrument makes it possible to obtain spectral reflectances at five received angles of 15°, 25°, 45°, 75°, and 110° to an incident angle of 45° through one-time measurement as shown in FIG. 1.

Then, an estimated regression formula for a wide-range angle from high-light of 10° up to a shade of 110° is obtained in accordance with the procedure in Japanese Patent Laid-Open No. 10045/1998, the spectral reflectance at each angle is estimated, and values of Lab* at 15°, 25°, 45°, 75°, and 110° are obtained in accordance with JIS Z8701 and JIS Z8729.

(2. Decision of Typical Color of Metallic Paint Colors)

The color and texture of a metallic color are changed depending on a metallic-color-observing angle. Therefore, it is difficult to uniquely specify the color of a metallic paint color. However, it is possible to decide one chromaticity coordinate value Lab* most suitable for visual observation by using an algorithm for deciding a typical color of metallic paint colors already disclosed in Japanese Patent Laid-Open No.211569/1999.

(3. Decision of Color Classification Codes of Metallic Paint Colors)

It is possible to chromatically classify colors by using the typical color Lab* of metallic paint colors. As a classification method, it is allowed to classify hue, brightness, and chroma (HVC) of Munsell, or hue, darkness, saturation (TDS), or a publicly-known color system such as the NCS color system according to the Swedish Standards Institution (SIS) into n groups and use the n groups as color classification codes. Though it is allowed to set the number of classes n to any value, it is necessary and sufficient for practical use to classify them into 5 to 50 classes (both included), more preferably 5 to 30 classes (both included).

If the number of classes n decreases, the number of hit cases increases in approximate-color retrieval using color classification codes to be described later but there are disadvantages that retrieval requires a lot of time and an unintended color is retrieved. However, when the number of classes n increases, it is possible to perform retrieval in a short time but there are disadvantages that the number of paint colors hit in retrieval decreases and the number of overlooked colors increases.

Moreover, it is allowed to convert Lab* into Lch* (L* denotes brightness and c* denotes metric chroma, and h* denotes metric hue) understandable by persons by simply using JIS Z8729 and then set groups obtained by dividing h* serving as a hue circle (360°) into n pieces. Furthermore, it is allowed to set color classification codes of achromatic colors by using the fact that achromatic colors have a small chroma c* and white among the achromatic colors has a high brightness L* and black has a low L*. It is advantageous to use Lch* because it is possible to set a color classification code through a simple computation.

Moreover, it is possible to correspond to a more specific request by using Hue-Tone values of Nippon Color and Design Research Institute Inc. frequently used for final coating of automobiles. In this case, a typical color Lab* of metallic paint colors can be easily decided in accordance with the method disclosed in Japanese Patent Laid-Open No. 211569/1999. By using the Hue-Tone values, an advantage is obtained that it is possible to set the division of color classification on a two-dimensional plane and moreover classify colors in accordance with the hue and tone (synthesized value generally having two characteristics of brightness and chroma though there is no strict definition) understandable by a designer.

Figure 2:
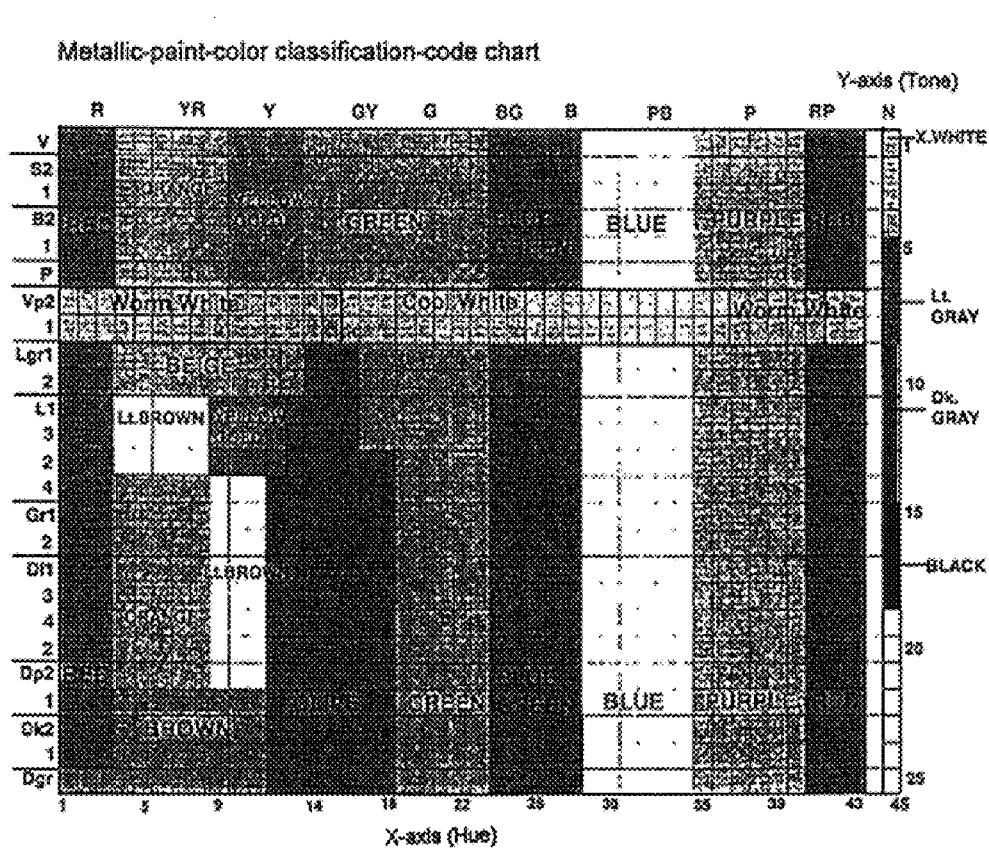
FIG. 2 is an illustration showing color classification codes of metallic paint colors.

To set color classification by using Hue-Tone values, all Hue-Tone faces are first divided into several color classification areas. It is allowed to artificially decide the above division method. When a paint-color-design color designer for final coating of automobiles uses a system of the present, it is preferable to use a color classification method familiar to a designer. It is preferable to decide how to divide the Hue-Tone faces and the number of Hue-Tone faces to be divided by considering the opinion of a user using this system. In this case, FIG. 2 is used which is adopted by a color designer who designs exterior colors of our automobiles.

A method for mathematically deciding the color classification code of a typical color of metallic paint colors provided by using a decided color-classification area is described below. It is possible to specify a color classification code as an area on a mathematical two-dimensional plane by using the scale of Hue serving as the abscissa (referred to as X axis) and the scale of Tone serving as the ordinate (referred to as Y axis). To set areas, coordinate points of four corners of a quadrangle are mathematically provided as (x1,y1), (x2,y2), (x3,y3), and (x4,y4).

It is easy to decide that Hue-Tone values of the typical metallic color are located in (x,y) coordinates and then, compute an area in which (x,y) is included by using the sequential operational function of a computer.

(4. Generation of Computer Graphic Image of Metallic Paint Color)

For computer graphics of metallic paint colors, it is necessary to know the color-reproducing characteristic of a monitor to be used by previously measuring the characteristic of the monitor by a spectral-radiant luminance meter.

The method for converting the colorimetric values XYZ into RGB of a monitor is the publicly-known fact and described in various documents. Moreover, to display computer graphics of metallic paint colors similarly to the case of visually observing them, the method described in the document 1 is effective and the present invention also uses the method same as that in the document 1.

(5. Generation of Metallic-paint-color Database)

Figure 3:
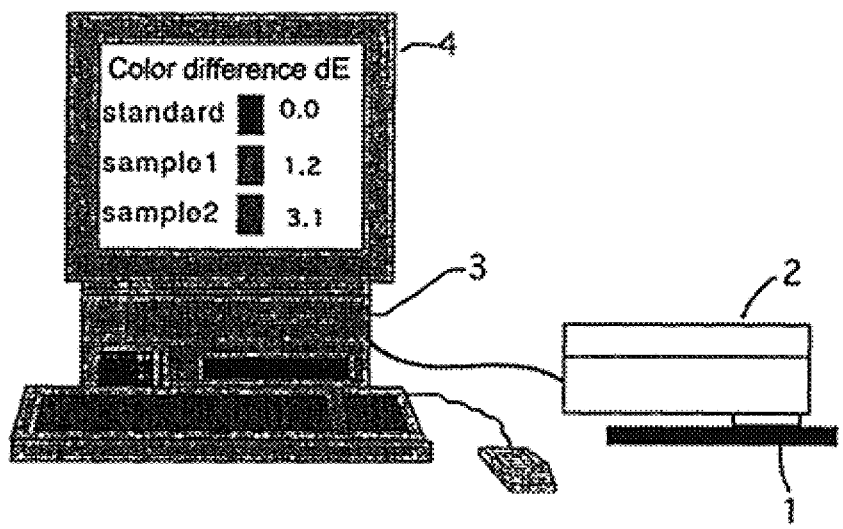
FIG. 3 is an illustration showing a computer system for retrieving an approximate color of a metallic paint color.

Lab* values of five angles, color classification codes, and computergraphic images obtained through the methods (1) to (4) are stored in symbol 3 in FIG. 3 serving as a computer memory. Storage in the memory is executed by database software. Though database software is available because it is marketed, software capable of storing computer graphic images is necessary.

(6. Quick-retrieval Algorithm for Metallic Paint Color)

It is allowed to select a metallic color to be retrieved (the metallic color concerned) out of a database or temporarily or permanently capture new colors into the database in accordance with the methods (1) to (4).

Then, color classification codes same as the color classification code of the metallic paint color concerned are extracted from the database to compute the weighted-angle average color difference between only the extracted codes in the next step. The color classification codes are primary-screened to avoid nonsense approximate-color computation of a chromatic metallic color or the like.

Then, weighted color difference computation is performed. A color difference is computed as a difference between the metallic color concerned and a pain color in the database. When expressing the metallic color concerned by a symbol std, it is possible to express the difference between brightnesses of the high-light 15° as dL15=L15−std_L15. In this case, to perform description by using a color-difference computation formula, the symbol of the chromaticity coordinate Lab* between the metallic paint color concerned and a paint color in the database is described below.

(Symbol)

Metallic saint color concerned std_L15, std_a15, and std_b15 are L*, a*, and b* at a received angle of 15°.

std_L25, std_a25, and std_b25 are L*, a*, and b* at a received angle of 25°.

std_L45, std_a45, and std_b45 are L*, a*, and b* at a received angle of 45°.

std_L75, std_a75, and std_b75 are L*, a*, and b* at a received angle of 75°.

std_L110, std_a110, and std_b110 are L*, a*, and b* at a received angle of 110°.

Paint colors in database

L15, a15, and b15 are L*, a*, and b* at a received angle of 15°.

L25, a25, and b25 are L*, a*, and b* at a received angle of 25°.

L45, a45, and b45 are L*, a*, and b* at a received angle of 45°.

L75, a75, and b75 are L*, a*, and b* at a received angle of 75°.

L110, a110, and b110 are L*, a*, and b* at a received angle of 110°.

A general formula of weighted color differences is shown as the following expression (1).

Expression (1):

$$dE15 = \sqrt{kL15*(L15-std\_L15)^2 + (a15-std\_a15)^2 + (b15-std\_b15)^2}$$

$$dE25 = \sqrt{kL25*(L25-std\_L25)^2 + (a25-std\_a25)^2 + (b25-std\_b25)^2}$$

$$dE45 = \sqrt{kL45*(L45-std\_L45)^2 + (a45-std\_a45)^2 + (b45-std\_b45)^2}$$

$$dE75 = \sqrt{kL75*(L75-std\_L75)^2 + (a75-std\_a75)^2 + (b75-std\_b75)^2}$$

$$dE110 = \sqrt{kL110*(L110-std\_L110)^2 + (a110-std\_a110)^2 + (b110-std\_b110)^2}$$

In the above expression, Sqrt is a symbol for computing a square root, ^2 is a symbol for showing square, and each of kL15, kL25, . . . , and kL110 is a weighted factor every angle.

By decreasing values of the weighted factors by the weighing factor of a brightness L* at the high-light side, the weighted factors are suitable for visual observation. Specifically, the value of kL15 ranges between 0.3 and 1.0 (both included), more preferably between 0.5 and 0.8 (both included), and the value of kL25 ranges between 0.3 and 1.0 (both included), more preferably between 0.5 and 0.8 (both included). Because values of kL45, kL75, and kL110 are not specified, it is unnecessary to correct the values.

Then, a weighted average color difference is computed in accordance with the following expression (2).

Expression (2):

$$dE = (k15*de15 + k25*de25 + k45*de45 + k75*de75 + k110*de110)*0.2$$

In the above expression, symbol k** denotes the weighted factor of a color difference for each angle.

Symbol de** denotes a value obtained in accordance with the expression (1).

The value 0.2 at the end of the right side denotes "5 divided by" for obtaining the average value of five angles.

By decreasing the value of a weighted factor at the high-light side and increasing it at the shade side, it is suitable for visual observation that the value of k15 ranges between 0.5 and 1.0 (both included), more preferably between 0.7 and 0.9 (both included), the value of k25 ranges between 0.5 and 1.0 (both included), more preferably between 0.7 and 0.9 (both included), the value of k45 ranges between 0.5 and 1.5 (both included), more preferably between 0.8 and 1.2 (both included), the value of k75 ranges between 1.0 and 2.0 (both included), more preferably between 1.2 and 1.7 (both included), the value of k75 ranges between 1.0 and 2.0 (both included), more preferably between 1.2 and 1.7 (both included), and the value of k110 ranges between 1.0 and 2.0 (both included), more preferably between 1.2 and 1.7 (both included) accordance with a computer-sorting algorithm.

Finally, the metallic paint color is set to the top and then, approximate-color retrieval results are arranged in accordance with the ascending order of the weighted-angle average color differences dE, computer graphics of paint color names, dE, and metallic paint colors are arranged, and thus these data are displayed on the monitor 4 in FIG. 3.

Figure 4:
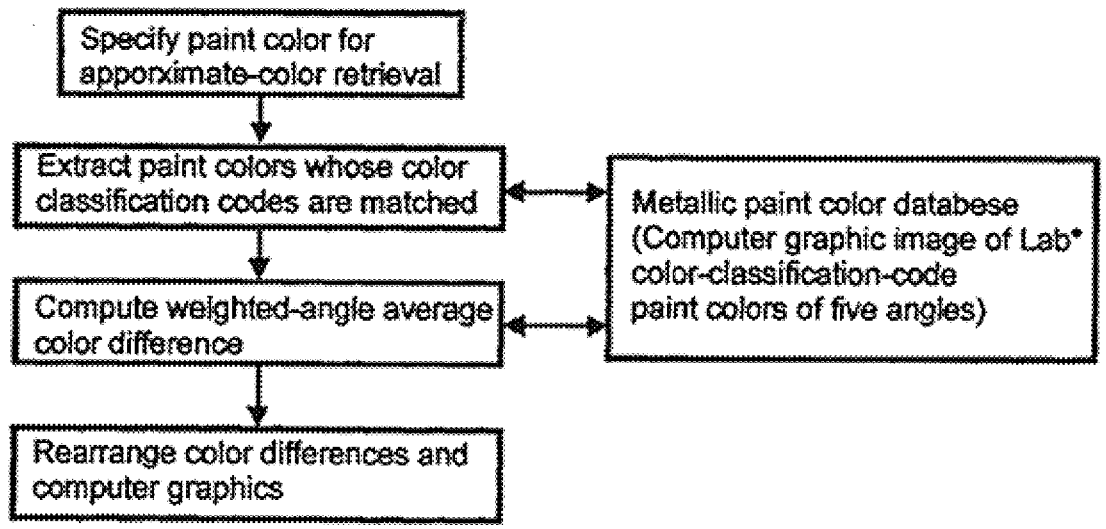
FIG. 4 is a system flow chart.

FIG. 4 shows a system flow of a preferred embodiment of the present invention.

Embodiment (1. Measurement of Stock Colors)

Colorimetric values of five angles are obtained by measuring the total of approx. 14,000 colors including approx. 7,000 stock colors prepared in the past, 4,000 actual paint colors of color charts of auto colors for 10 years issued by Nippon Color and Design Research Institute Inc. every year, and approx. 3,000 colors of various color books by the portable multi-angle spectrophotometer MA68 made by X-Rite Inc. in US. Optical conditions of MA68 are five angles in which declinations from specular reflected light are 15° and 25° at the high-light side, 45° at the face, and 75° and 110° at the shade side.

(2. Preparation of Color Classification Tables)

Two color classification tables are prepared. One of them shows color names described by a method for classifying colors into nine classes at a hue angle of CIE Lch* in accordance with the following expression (3) and final color-classification symbols are shown in Table 1 below.

Expression (3):

| RED = | (000 < h* < = 030.0) or (345 < h* < = 360.0) |
| --- | --- |
| ORANGE = | (030 < h* < = 080.0) |
| GREEN_YELLOW = | (080 < h* < = 165.0) |
| GREEN = | (165.0 < h* < = 200.0) |
| BLUE_GREEN = | (200.0 < h* < = 230.0) |
| BLUE = | (230.0 < h* <= 300.0) |
| PURPLE = | (300.0 < h* <= 345.0) |
| GRAY = | (c* < = 10.0) |
| WHITE = | (L* > 75.0 and c* <= 10.0) |

In the above expression:
Symbol L* denotes L* of CIE Lab*.
Symbol c* denotes a value referred to as metric chroma which is c* of CIE Lch*.
Symbol h* denotes a value referred to as metric hue which is h* of CIE Lch*.

TABLE 1

Color-classification code table

| No. | First nine classifications | Second twenty-eight classifications |
| --- | --- | --- |
| 1 | RED | RED.L |
| 2 | ORANGE | RED.M |
| 3 | GREEN_YELLOW | RED.H |
| 4 | GREEN | BROWN |
| 5 | BLUE_GREEN | Lt.BROWN |
| 6 | BLUE | BEIGE |
| 7 | PURPLE | ORANGE |
| 8 | GRAY | YELLOW |
| 9 | WHITE | OLIVE |
| 10 | | GREEN.L |
| 11 | | GREEN.M |
| 12 | | GREEN.H |
| 13 | | BLUE.GREEN.L |
| 14 | | BLUE.GREEN.M |
| 15 | | BLUE.GREEN.H |
| 16 | | BLUE.L |
| 17 | | BLUE.M |
| 18 | | BLUE.H |
| 19 | | PURPLE.L |
| 20 | | PURPLE.M |
| 21 | | PURPLE.H |
| 22 | | Warm.Lt.GRAY |
| 23 | | Cool.WHITE |
| 24 | | Warm.Lt.GRAY |
| 25 | | Cool.Lt.GRAY |
| 26 | | Warm.Dk.GRAY |
| 27 | | Cool.Dk.GRAY |
| 28 | | BLACK |

Another one of them is prepared as a basic table of 18 classifications shown in FIG. 2 in accordance with opinions of a color designer relating to development of paint colors for final coating of automobiles by using M*MC of Nippon Color and Design Research Institute Inc. Moreover, the color names are classified into high brightness, middle brightness, and low brightness by using the brightness L* of the typical color CIE Lab* of metallic paint colors and the following expression (4).

Expression (4):

Low brightness $(.L)=(L^* < 30.0)$

Middle brightness $(.M)=(30.0 <= L^* < 75.0)$

High brightness $(.H)=(L^* <= 75.0)$

Moreover, when HUE-TONE values of the metallic typical color comes to X.WHITE at the top right in FIG. 2, the color names are further classified into Warm.White and Cool.White by using the following expression (5).

Expression (5):

Cool.WHITE=$(102.0 < h^* <= 291.0)$

Warm.WHITE=not (Cool. White)

The hue angle h*=102.0 corresponds to 5GY in terms of Hue and h*=291.0 corresponds to 5P in terms of Hue.

Finally, 9 classification codes and 28 classification codes in Table 1 are obtained. Symbols .H, .M, and .L in Table 1 denote the classification of three brightnesses in the expression (4).

(3. Generation of Computer Graphic)

An image of the metallic paint color of a full car of 100 pixels in the transverse direction and 128 pixels in the longitudinal direction is generated by referring to Japanese Patent Laid-Open No.10045/1998 and the document 1 "Automobile paint-color design system using computer graphic" color material, 69[12], 801–809(1996). The image format uses the PICT format.

(4. Generation of Database)

Measurement names, measured reflectances of five angles, Lab*, Lab* of typical metallic color, its Hue and Tone values, color classification codes, and computer graphic images of all stock colors are stored in Pro ver4 of FileMaker Inc. which is marketed database software.

(5. Approximate Color Retrieval)

An optional paint color is selected out of a database to retrieve whether an approximate color is present in the database by using the selected paint color as a reference color std. Nine color classification codes and twenty-eight coloreclassification codes are used for purposes different from each other. To retrieve orange-, yellow-, and purple-based colors that are not frequently used as exterior colors of automobiles, it is preferable to widen the range of retrieval objects by using nine color classification codes. However, because a lot of standard colors of automobiles such as red-, blue-, white-, silver-, and white-pear-based colors are used, it is possible to quickly achieve an object by using finer twenty-eight color classification codes. Only colors having the same color classification code are extracted to compute a weighted-angle average color difference by using the following expressions (5) and (6) on the basis of the expressions (1) and (2).

Expression (5):

$$dE15=\text{Sqrt}(0.6*(L15-std\_L15)^2+(a15-std\_a15)^2+(b15-std\_b15)^2)$$

$$dE25=\text{Sqrt}(0.8*(L25-std\_L25)^2+(a25-std\_a25)^2+(b25-std\_b25)^2)$$

$$dE45=\text{Sqrt}(1.0*(L45-std\_L45)^2+(a45-std\_a45)^2+(b45-std\_b45)^2)$$

$$dE75=\text{Sqrt}(1.0*(L75-std\_L75)^2+(a75-std\_a75)^2+(b75-std\_b75)^2)$$

$$dE110=\text{Sqrt}(1.0(L110-std\_L110)^2+(a110-std\_a110)^2+(b110-std\_b110)^2)$$

Expression (6):

$$dE=(0.8*de15+0.9*de25+1.0de45+1.2*de75+1.5*de110)*0.2$$

A table is prepared by measuring the time required for approximate-color retrieval and quantitatively evaluating advantages of the present. Because the table computing time depends on the throughput of a computer system, the absolute value of the computing time (sec) does not have any meaning but only the relative value of the computing time has a meaning. Moreover, to confirm the validness of a weighted-angle average color difference serving as an important parameter for retrieving an approximate color, the color difference is compared with the normal angle average color difference {factors k** in the expressions (1) and (2) are all equal to 1.0}.

TABLE 2

| | | Results | | | |
|---|---|---|---|---|---|
| | Metallic | Retrieval time (sec) | | Not | Weighted |
| No. | paint color concerned | No color classification | Nine color classification | Twenty-eight color classification | weighted Normal color difference | Angle average color difference |
| 1 | Silver metallic color | 42 | 12 | 3 | O | X |
| 2 | Dark blue mica color | 38 | 7 | 3 | O | X |
| 3 | Olive mica color | 38 | 5 | 2 | Δ | O |
| 4 | Orange metallic color | 47 | 6 | 2 | Δ | O |

Symbol: Is ascending-order color differences and colors in order not correlating with visual observation among 20 colors included in retrieval results?,
X = Not included; O = At least one color is included; Δ = Three or more colors are included.

In this case, silver metallic color is used as case 1, dark blue mica color is used as case 2, olive mica color is used as case 3, and orange metallic color is used as case 4. Cases 1 and 2 are standard final-coating paint colors of automobiles, which are referred to as basic colors to be most frequently developed. Cases 3 and 4 are referred to as character colors that are in a small number of color areas in the field of final coating of automobiles. It is found that a color to be more frequently developed requires more time for approximate-color retrieval. When screening is not performed for color classification, the retrieval time requires 38 to 47 sec. Then, when screening colors whose color differences are computed in accordance with nine-color classification, 5 to 12 sec are required.

The case of performing screening by 28-color classification requires only 2 to 3 sec. In general, when a color designer performs approxnmate-color retrieval, the operation efficiency is further improved as the time required for one-time retrieval decreases because trial is repeated many times by trial and error.

Finally, weighted-angle average color differences are rearranged in an ascending order, the metallic color concerned is set to the top, the weighted-angle average color differences and computer graphics are arranged on a monitor, and a color designer visually evaluates approximate colors. Table 2 shows results of comparing the effect of weighted-angle average color differences with normal color differences. Evaluation is performed by visually comparing whether the order of color differences arranged in an ascending order is valid with computer graphics. As a result, one to three colors having an abnormally high high-light brightness are included in high-order 20 colors in the case of normal color differences. However, when using weighted-angle average color differences, the above abnormal values are not present and an approximate color desired by a designer is obtained.

Finally, the advantage of evaluating an approximate color by using computer graphics is described. A designer does not have to study values of color differences in detail but the designer almost evaluates the similarity of computer graphics. Thus, in the case of the commodity development laying stress on the sense, the information obtained from images (high-light brightness and change of shade colors) is much more than simple mathematical approximations. Therefore, it is found that it is indispensable to use computer graphics together.

What is claimed is:

1. A method for retrieving a metallic paint color of an approximate color, comprising:
    a step of storing color classification codes of a plurality of metallic paint colors in a memory of a computer;
    a step of measuring the multi-angle colorimetric value CIE Lab* of a specific metallic paint color;
    a step of deciding a color classification code to which the specific metallic color belongs in accordance with the multi-angle colorimetric value CIE Lab*;
    a step of inputting the color classification code to which the specific metallic color belongs to the computer; and
    a step of retrieving a metallic paint color of an approximate color by applying approximate-color computation for computing a color difference only to a metallic paint color having the same color classification as the one to which the specific metallic color belongs among the plurality of metallic paint colors stored in the memory of the computer; said approximate-color computation comprising weighting multi-angle colorimetric value.

2. The method according to claim 1, wherein the color classification code is a code which is assigned to each of five to 100 groups into which all metallic paint colors have been classified according to their chromatic properties.

3. The method according to claim 2, wherein approximate-color computation includes multiplying L* value of each angle by a weighted factor so as to correlate with visual observation in each angle area from high-light up to shade when computing a CIE color difference in accordance with the CIE Lab* value of multi-angle.

4. The method according to claim 3, wherein a weighted factor ranges between 0.5 and 1.0 (both included) at the high-light side {in terms of open angle from specular reflected light between 10° and 25° (both included)}, between 0.5 and 1.5 (both included) at the face side {between 26° and 74° (both included)}, and between 1.0 and 2.0 (both included) at the shade side {between 5° and 110° (both included)}.

5. The method according to claim 4, wherein a weighted factor further prevents the difference between brightnesses of high-light from increasing to a degree felt through visual observation or more by multiplying the weighting factor of the brightness L* at the high-light side {between 10° and 25° (both included) in terms of open angle from specular reflected light} by 0.3 to 1.0 (both included).

6. The method according to claim 1, wherein when displaying an approximate-color retrieval result on a computer screen, computer graphics of metallic paint colors are displayed starting with the smallest weighted-angle average color difference so that a person can visually select an approximate color.

7. The method according to claim 2, wherein when displaying an approximate-color retrieval result on a computer screen, computer graphics of metallic paint colors are displayed starting with the smallest weighted-angle average color difference so that a person can visually select an approximate color.

8. The method according to claim 3, wherein when displaying an approximate-color retrieval result on a computer screen, computer graphics of metallic paint colors are displayed starting with the smallest weighted-angle average color difference so that a person can visually select an approximate color.

9. The method according to claim 4, wherein when displaying an approximate-color retrieval result on a computer screen, computer graphics of metallic paint colors are displayed starting with the smallest weighted-angle average color difference so that a person can visually select an approximate color.

10. The method according to claim 5, wherein when displaying an approximate-color retrieval result on a computer screen, computer graphics of metallic paint colors are displayed starting with the smallest weighted-angle average color difference so that a person can visually select an approximate color.

* * * * *